Dec. 1, 1953  F. R. CLARK ET AL  2,660,845
MACHINE FOR PREPARING FUSEES
Filed Aug. 23, 1949  8 Sheets-Sheet 1

INVENTORS
FRANCIS R. CLARK
CARL J. WEST JR.
BY George H. Mortimer
attorney

Dec. 1, 1953 F. R. CLARK ET AL 2,660,845
MACHINE FOR PREPARING FUSEES
Filed Aug. 23, 1949 8 Sheets-Sheet 3

INVENTORS
FRANCIS R. CLARK
CARL J. WEST JR.
BY George H. Mortimer
Attorney

Dec. 1, 1953    F. R. CLARK ET AL    2,660,845
MACHINE FOR PREPARING FUSEES
Filed Aug. 23, 1949    8 Sheets-Sheet 4

INVENTORS
FRANCIS R. CLARK
CARL J. WEST JR.
BY George H. Mortimer
Attorney Dec. 1, 1953   F. R. CLARK ET AL   2,660,845
MACHINE FOR PREPARING FUSEES
Filed Aug. 23, 1949   8 Sheets-Sheet 6

Fig-6-

INVENTORS
FRANCIS R. CLARK
CARL J. WEST JR.
BY George H. Mortimer
attorney

Patented Dec. 1, 1953

2,660,845

UNITED STATES PATENT OFFICE 2,660,845

MACHINE FOR PREPARING FUSEES

Francis R. Clark, Orange, N. J., and Carl J. West, Jr., Columbus, Ohio, assignors to 225 Enterprises Inc., Orange, N. J., a corporation of Ohio Application August 23, 1949, Serial No. 111,802

13 Claims. (Cl. 53—112)

1

The present invention relates to a machine for preparing fusees, starting with the preformed rods or cylinders of fusee material and automatically performing each operation necessary to prepare them for market.

The conventional fusee comprises a rod or cylinder of fusee material about ⅞ of an inch in diameter of desired length, the most common sizes being approximately a four inch length which is known as a five minute fusee and about an 8 inch length which is known as a ten minute fusee. The cylinder of fusee material is wrapped within several turns of a paper cover which is slightly longer than the cylinder. One end of the cover is spun over the periphery of the end of the cylinder around a predrilled hole about an inch deep which is thereafter filled with an igniter composition. The other end of the fusee is customarily finished in either of two different ways. In one of these a plug, e. g. a disc of fibrous material such as cardboard, of the same diameter as the cylinder is adhesively secured thereto and the paper cover is spun over it. In another of these a plug with a spike driven through it is inserted into the cavity formed by the extending cover and cemented in place with the sharp end of the spike exposed. For some purposes a long handle is substituted for the spiked plug.

Heretofore the drilling, wrapping and finishing of the ends of fusees has entailed much hand labor. The present invention provides a machine which performs these operations automatically, having means selectively operable to finish the lower ends of fusees of different lengths with either a plain or a spiked plug. The structure, advantages and other objects of the invention will be clear from the following detailed description, taken in conjunction with the drawings in which:

2

Figure 1:
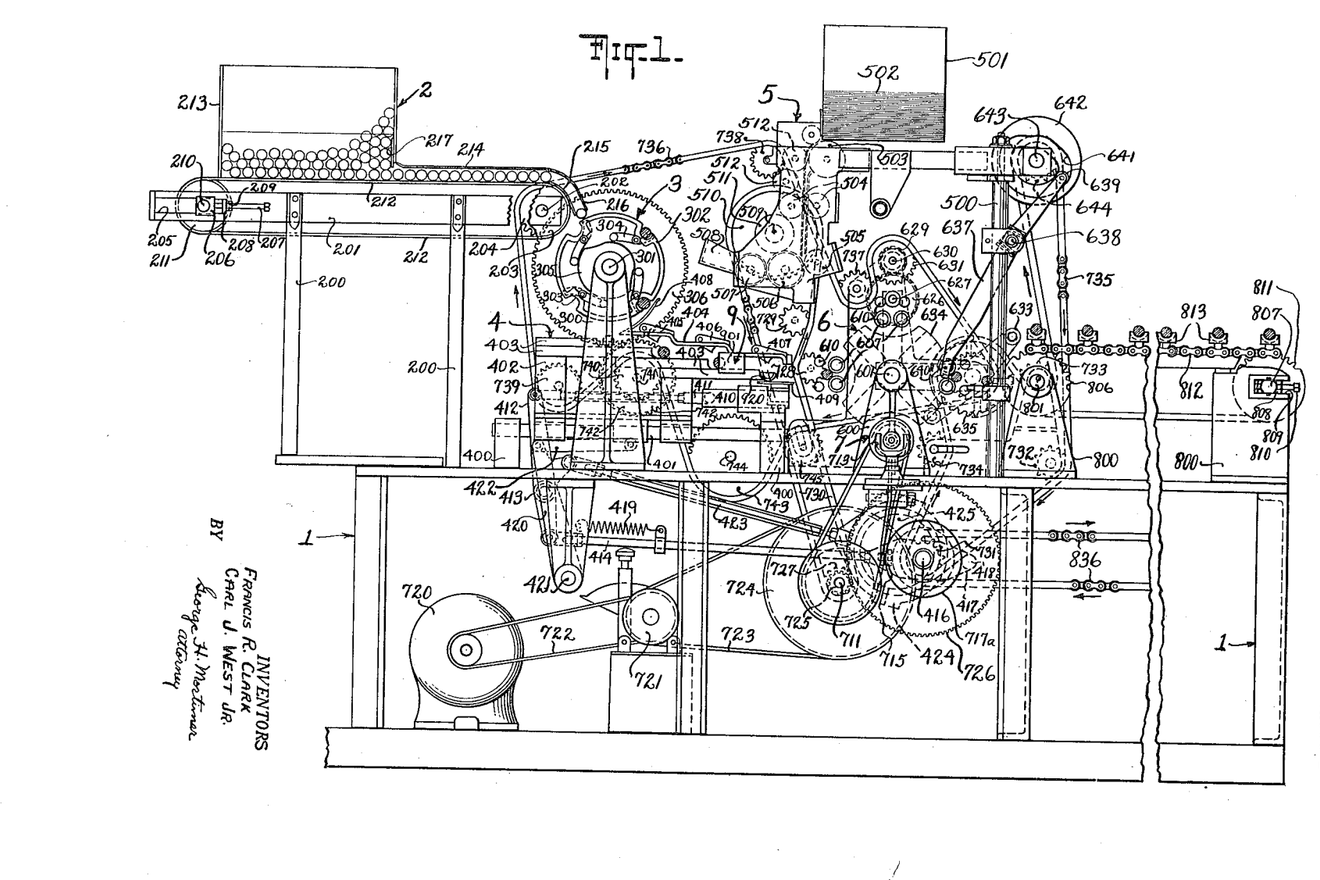
Fig. 1 is a fragmentary front elevation of the major portion of the machine, somewhat schematic in parts and with some elements omitted for clarity of illustration.

Referring now more particularly to Fig. 1, the machine comprises a frame 1 for supporting the various elements and parts, including a fusee cylinder hopper and feed element 2, a drilling mechanism 3, a pusher mechanism 4, a wrapper gluing and feed mechanism 5, a wrapper rolling device 6, a wrapper end spinning device 7, and means for applying a plug to the lower end of the fusee. This may be a spiked plug inserting mechanism 8 (Figs. 5, 6 and 7) which articulates with the elements of Fig. 1 in the position broken away at the right end thereof, or simply a disc applicator 9 (Figs. 12, 13 and 14) which articulates with the elements of Fig. 1 near the end of the pusher mechanism 4 as indicated by the parts numbered 901 and 920.

Fusee cylinder hopper and feed

This element of the combination includes uprights 200 secured to the frame 1 which carry a pair of spaced cross bars 201 at their upper ends. A shaft 202 is journaled in the cross bars adjacent to the right end thereof as seen in Fig. 1. A pulley 203 is fixed to shaft 202 between the cross bars 201. Behind the back cross bar a sprocket 204 is also fixed to shaft 202. At the left end of each cross bar 201 is a horizontal slot 205 in each of which a journal block 206 is slidably mounted for adjustment by a screw 207 which has threaded engagement with a nut 208 secured to cross bar 201. A lock nut 209 maintains the screw in any set position of adjustment. A shaft 210 is rotatably mounted in journal blocks 206 and it carries pulley 211 between the cross bars 201. A belt 212 runs around pulleys 203 and 211, being brought to the correct tension by adjustment of screws 207. The upper flight of belt 212 forms the bottom of a hopper 213 in which a large number of fusee rods or cylinders can be placed at one time for processing in the machine to prepare them for market. The right wall of the hopper 213 terminates short of the belt 212 by a distance somewhat greater than the diameter of the fusee rods and the remainder of the upper flight is covered by an upper guide plate 214 which is similarly spaced therefrom. At the right end of the conveyor the plate 214 curves downwardly and, together with a lower guide plate 215, forms a chute 216. At its left end the plate 214 is curved upwardly to give a funnel effect and the adjacent wall of the hopper 213, i. e., the right end as viewed in Fig. 1, may be provided with an adjustable bar 217 to assure proper feed of the fusee rods from the hopper in a single row on the belt as shown.

In order to adapt the machine to handle fusee rods of different lengths, a belt 212 approximately the same width as the longest fusee is used and the front wall of hopper 213, as viewed in Fig. 1 and which is omitted in the drawing, may be made adjustable toward and away from the back wall. In this way the far ends of the fusee rods occupy the same position for all lengths of rods.

In operation the sprocket 204, which is driven by a chain later to be described, rotates the pulley 203 clockwise and thereby moves the upper flight of the belt 212 to the right as seen in Fig. 1. This causes the fusee rods to align themselves transversely of the belt and to leave the hopper in a single row. The rods are then delivered to the chute 216 which feeds them one by one into the drilling mechanism now to be described.

Drilling mechanism

Uprights 300, secured to frame 1 at their lower ends, provide journals in their upper ends for a shaft 301 which carries a turret 302 between the uprights. In the periphery of the turret 302 are several pockets 303 of semi-cylindrical shape into which the fusee rods are fed from chute 216. Each pocket is provided with a bell crank 304 pivoted to the turret so that gripping fingers at one side of the pivot are adapted to engage the fusee rod in the pocket and hold it against movement in the pocket while an arm at the other side engages a cam 305 fixed to the upright 300. Cam 305 controls the release of the fingers from the fusee rod against the pressure of a spring (not shown) which biases the bell crank to engaged position. The cam 305 has a high portion and a low portion, each covering about half of the periphery and so arranged that the gripping fingers are held in open position as a pocket in the turret 302 approaches the end of the chute 216 to receive the lowermost fusee rod therein, then moved to engaged position until the pocket approaches the bottom of the orbit when they are moved to open position again. The turret is rotated in clockwise direction, as viewed in Fig. 1, by a gear 306 fixed to a shaft 301, being driven by a pinion later to be described.

Also mounted on shaft 301, and behind the turret 302 as viewed in Fig. 1 is the drilling mechanism proper comprising a drill spindle turret carrying the same number of spindles as there are pockets 303, each spindle being provided with a chuck for holding a twist drill at the end toward turret 302 and a gear at the other end for driving the spindle from a motor driven gear common to all the spindles. The spindles are movable toward and away from turret 302 under control of a cam which starts the drill into a fusee cylinder near the top of the orbit, finishes the inward movement in about 90° of rotation of the turret and withdraws the drill before the gripping jaws are released. This mechanism forms no part of the present invention and may be of any suitable specific form, e. g., that shown in Fishburne Patents 1,021,242; 1,034,436.

Stepped pusher

Figures 13, 14:
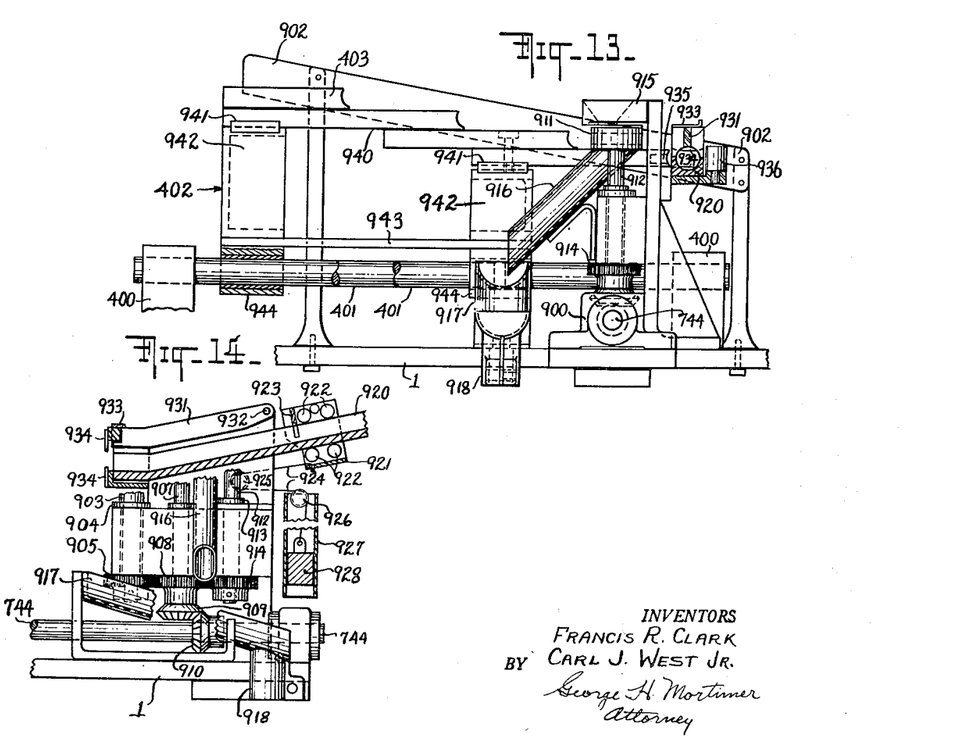
Fig. 13 is a fragmentary front view of Fig. 12.
Fig. 14 is a fragmentary side view of Fig. 12 looking from left with parts broken away to show details of construction.

Posts 400 mounted on frame 1 provide support for a pair of horizontal rods 401 on which a carriage 402 is mounted for reciprocatory motion from left to right as viewed in Figs. 1 and 13. The upper surface of the carriage 402 is in the form of a plurality of steps 403, but this is not essential, being merely a suitable device for moving the drilled fusees the requisite horizontal distance without reciprocating the pusher the whole distance. Above each of the steps 403 except the top one and secured to the frame 1 is a stepped guide 404 having one less step than the pusher 4. Each step of the guide is spaced above the corresponding step of the pusher a distance slightly greater than the diameter of the fusee rods. The steps of the guide 404 are joined by sloping risers and the lowest step ends in a downturned stop, these risers and stops being spaced from the end of the next higher step at the limit of its movement to the right a distance slightly greater than the diameter of the fusee rods. A pair of latches is pivoted to each step of the guide with their free ends extending below the guide into the path of a fusee rod on the step of the pusher. The respective pairs of latches bear numbers 405, 406, and 407. At the left end of the guide 404 is an arcuate guide 408 which extends backwardly along the turret 302 generally parallel thereto to assure that a fusee rod released from the turret will fall into position in front of the uppermost step 403 when it is in its starting position for the cycle of operations now to be described.

With a fusee rod in the position just recited, the carriage 402 moves to the right carrying the fusee rod on the second step with the first step acting as a pusher. Toward the right end of the movement the fusee lifts latches 405 as it passes under them but as soon as it has passed the latches fall behind it and prevent it from being carried backwardly on the return of the carriage to its starting position at the left, thus advancing the fusee rod to the next step down. On next movement to the right the same action takes place under latches 406, advancing the rod to the bottom step where the same action takes place on the next trip under latches 407. In the mean time a new rod has been deposited in front of the first step each time it returned to starting position and in this way each of the steps is always provided with a fusee rod.

Below the right end of the lowest step 403 is a traveling platform 409 supported by a fusee transport 410 which is mounted in the post 400 for reciprocatory movement from left to right as seen in Fig. 1. In its starting position at the left, the front end of the platform 409 is substantially aligned with the front end of guide 404 so that the lowest fusee on pusher 402 is transferred to the platform 409.

The drive for the fusee transport 410 comprises a connecting rod 411 pivoted at one end to the transport and at the other to the upper end of a lever 412 which is fulcrumed intermediate its ends to the frame 1 at 413. The lower end of lever 412 is pivoted to a connecting rod 414 to which reciprocatory movement is imparted by a cam 415 fixed on a cam shaft 416. A fork 417, which spans the shaft 416 and is guided thereby, forms the end of the connecting rod 414 as clearly seen in Fig. 8. A roller 418 rotatably mounted near the end of fork 417 is kept in engagement with the periphery of cam 415 by a spring 419 (Fig. 1).

Figures 2, 8, 9:
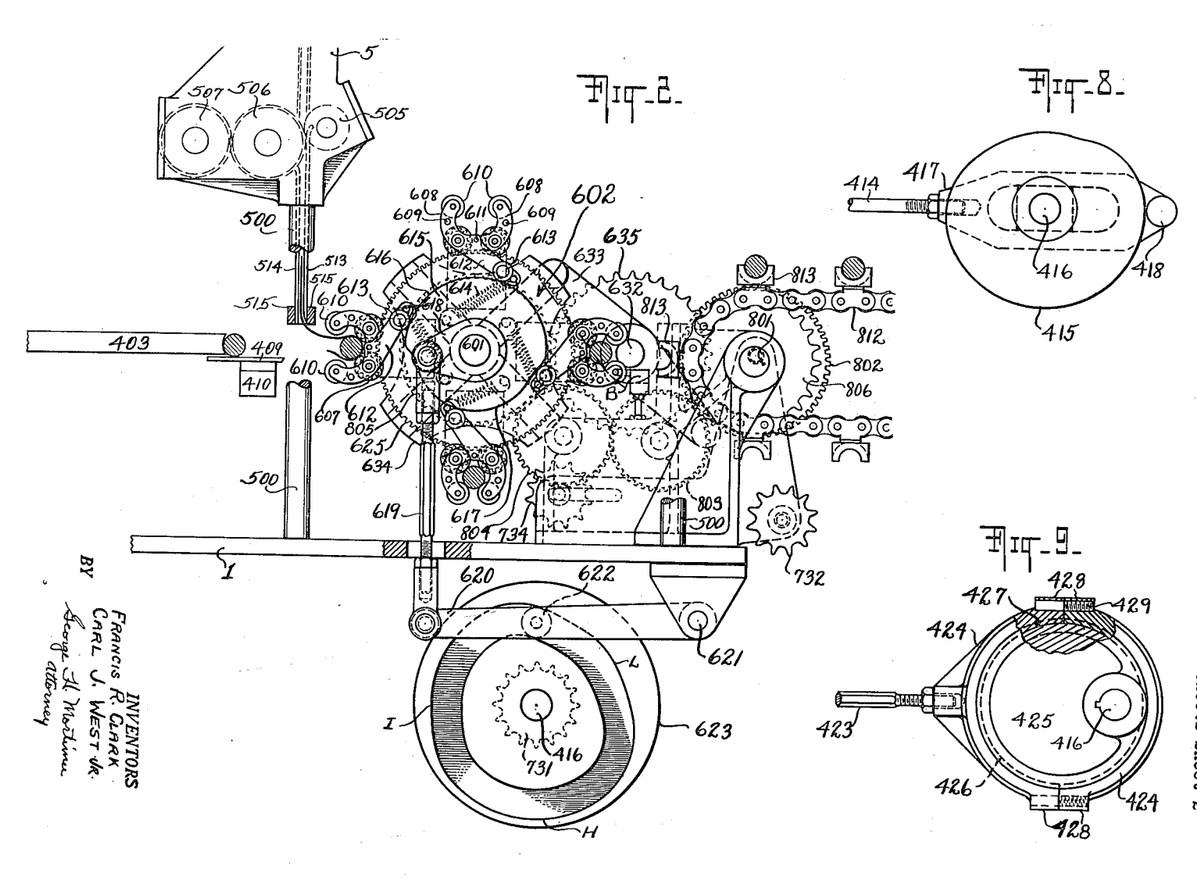
Fig. 2 is a fragmentary front elevation of the wrapping mechanism and some related parts on a somewhat larger scale.
Fig. 8 is a section on the line 8—8 of Fig. 4.
Fig. 9 is a section on the line 9—9 of Fig. 4.
Figures 4, 16:
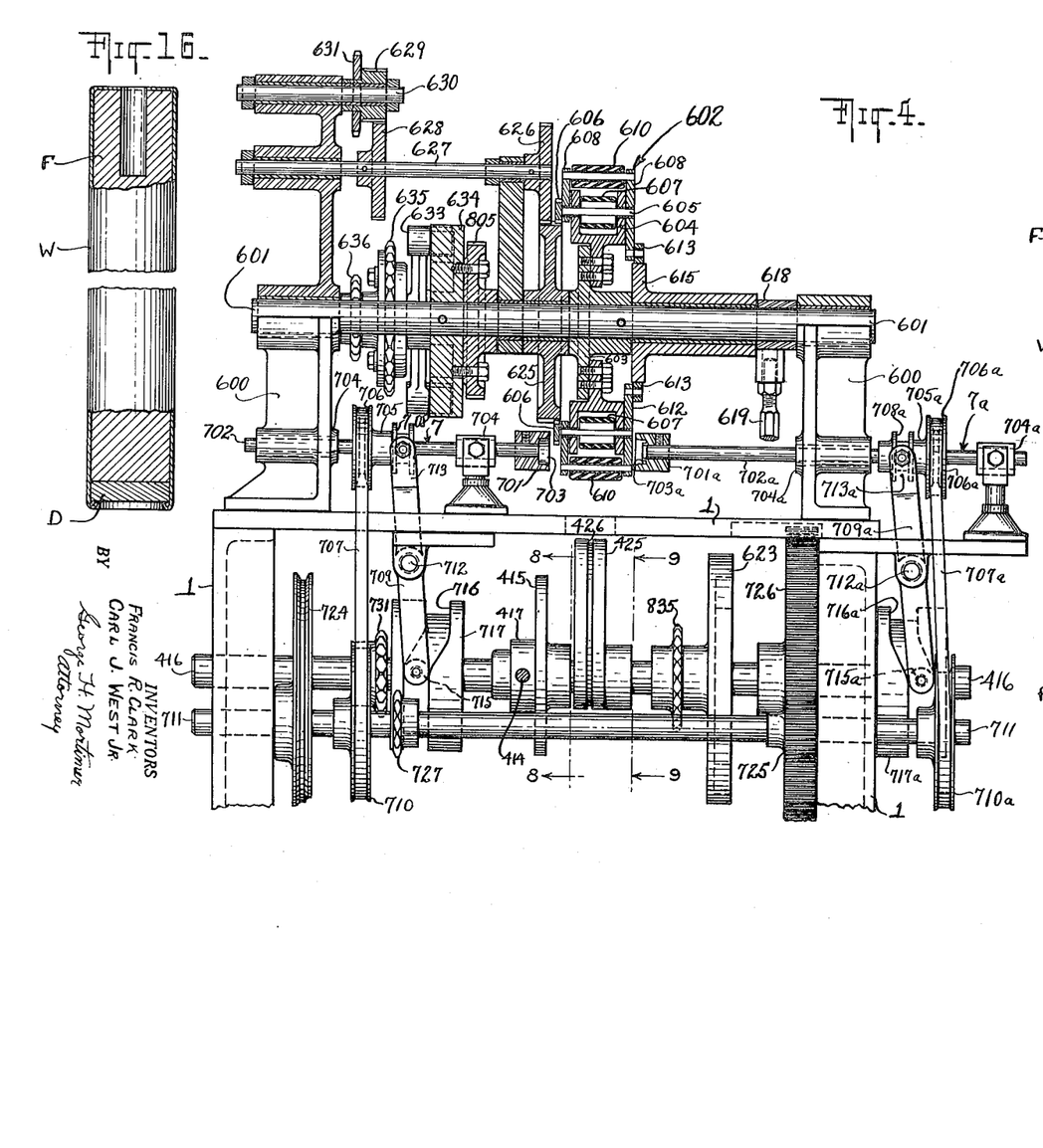
Fig. 4 is an end elevation looking to the right of Fig. 2 with some parts in section.
Fig. 16 is a view, partly in section of a disc-end fusee, such as ordinarily used on highways.

Carriage 402 is reciprocated by a similar mechanism comprising a lever 420 pivoted to the frame 1 at its lower end as shown at 421 and connected at its upper end to the carriage by a pivoted link 422. A connecting rod 423 is pivoted at one end to an intermediate portion of lever 420. The other end of rod 422 connects with a strap 424 of an eccentric 425 which is fixed to shaft 416 (Figs. 1, 4 and 9). The periphery of the eccentric is provided with a groove 426 in which a rib 427 on the inner surface of strap 424 rides to keep the strap on the eccentric. As seen in Fig. 9, the strap is made in two semicircular parts having end bosses 428 for machine screws 429 which secure the parts together around the eccentric 425.

The wrapper gluing and feed mechanism

The details of the mechanism 5 are not part of the invention and any device which will accomplish the function of the conventional one shown in the drawing may be used in place thereof without departing from the invention.

Frame members including uprights 500 support a magazine 501 in which a stack of wrapper sheets 502 is held in such a way that a sheet feed wheel 503 can remove them one at a time from the bottom of the stack. Like hopper 213, the front wall of the magazine 501 is made adjustable to hold wrappers of proper size for the different lengths of fusees. The lead end of the bottom sheet is directed downwardly between a pair of pinch rolls 504 and between back-up rolls 505 and a glue roll 506. The latter is supplied with glue by a glue transfer roll 507 from a supply kept in a glue trough 508. On a shaft 509, which is journaled in the frame, is mounted a sprocket 510 and a pinion 511 which meshes with gears for the glue roll 506 and the pinch rolls 504. The latter also meshes with the first of a train of two gears 512, the second of which drives the sheet feed wheel 503.

Figures 3, 15:
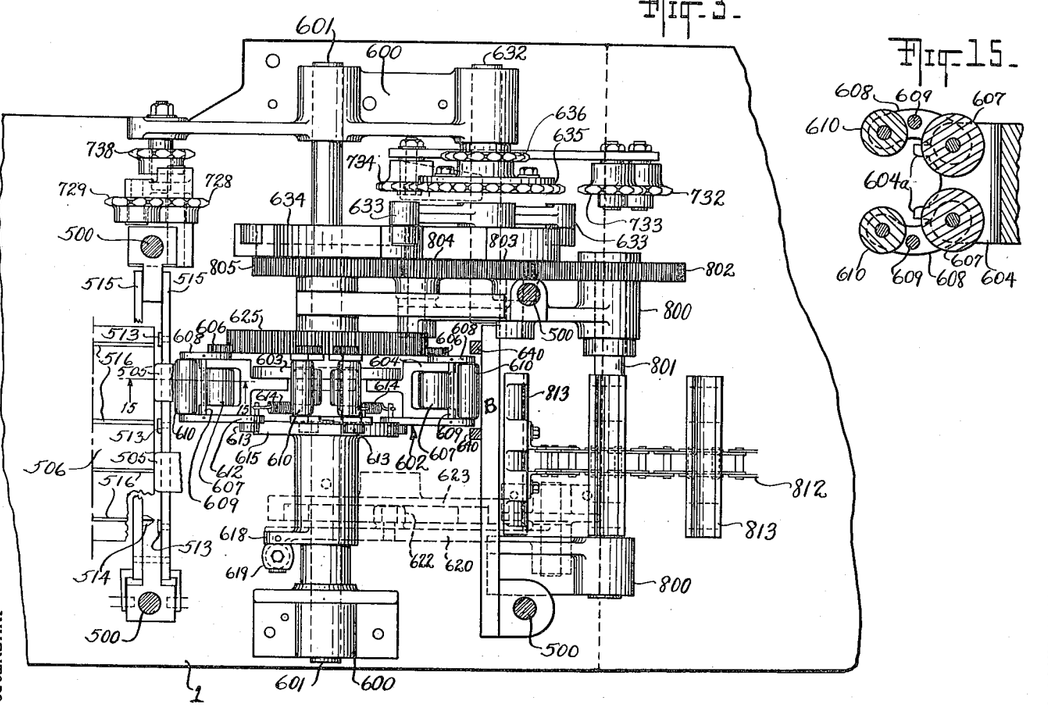
Fig. 3 is a plan view looking down on Fig. 2.
Fig. 15 is a fragmentary sectional view on the line 15—15 of Fig. 3.

Guide bars 513 for the uncoated side and co-operating guide bars 514 for the coated side of the wrapper are suitably secured to cross bars 515 which are fastened to upright 500 (Fig. 3). The upper ends of guides 513 and 514 are so arranged as to receive the glued wrapper leaving rolls 505 and 506. Bars 514 are tapered to a blunt edge toward the guide bars 513 so as to keep the area of contact with the wrapper at a minimum and it is preferred to provide the periphery of the glue roll 506 with grooves 516 in line with guides 514 so as to leave narrow bands of the wrapper sheets uncoated where the guides will engage. These guide bars terminate at their lower ends just above the path of a fusee on the platform 409 of the transport 410. See Fig. 2.

The rollers 505 are arranged so that only the upper one, as viewed in Fig. 3, engages the sheets for wrapping the short or 5 minute fusees whereas both engage a sheet for wrapping the long or 10 minute rods. When short fusees are being wrapped the lower roll 505 is moved along its shaft out of contact with the glue roll.

It will be seen from Figs. 1 and 3 that in passing over roll 506 a wrapper sheet is coated with glue over the entire surface which faces the platform 409 except for the narrow bands left by grooves 516. The coated sheet is delivered into the space between the platform and the wrapper rolling device 6 so that its lower end arrives somewhat below the level of the platform at the same time that the pusher 403 brings the fusee rod supported on the platform 409 into engagement with the glued surface. The fusee rods and wrapper are transported into the rolling device with the lower end of the sheet partially surrounding the rod and the upper end supported by guides 513 and 514 until the rolling operation begins.

The wrapper rolling device

Uprights 600 on frame 1 provide journals for an intermittently rotated shaft 601 upon which a turret 602 is fixed. The turret comprises an integral hub and disc 603 pinned to shaft 601 (Fig. 4) on which a plurality of bifurcated members having a pair of spaced arms 604 are bolted or otherwise suitably fastened at regular intervals. The end of each arm 604 preferably carries a pair of projections 604a (Fig. 15) separated by a semicircular recess of about the diameter of the wrapped fusee. A shaft 605 is journaled in and extends beyond each pair of arms 604. A gear 606 and a driven roller 607 are secured to the shaft outside and between the arms 604, respectively. It is preferred to have two such shafts 605 for each pair of the bifurcated arms, as shown most clearly in Figs. 2 and 15, which are spaced so that the peripheries of the driven rollers 607 form a cradle or pocket in which the fusee and wrapper are received and rotated, but one such roller can be used if desired. Loosely mounted on shaft 605 just outside the arms 604 are links 608, one at each side, which carry a holding roller 610 journaled in their free ends. A tie rod 609 extends between links 608 and, with the axle of roller 610, forms a yoke or cradle capable of oscillation about shaft 605. A pin 611 in one of the links 608 at each side of the cradle extends into a slot in the other link 608 so that the two yokes oscillate together but in opposite directions. One link 608 in each pair of yokes has an arm 612 with a cam roller 613 mounted near its end. A spring 614, which is connected at one end to arm 612 near roller 613 and at the other to disc 603 biases the links 608 with their respective holding rollers 610 to closed position. Each pair of yokes and associated parts forms a wrapping set or unit.

Movement of the holding rollers is controlled by a cam 615 loosely mounted on shaft 601 which has a high portion 616 and a low portion 617. When cam roller 613 engages high portion 616 the holding rollers are in open position to receive or discharge a fusee but when it engages the low portion 617 the spring 614 moves these rollers to closed or holding position against the fusee and wrapper sheet. The mechanism for moving cam 615 includes a crank arm 618 on the hub of the cam (Fig. 3), a connecting rod 619 (Fig. 2), a lever 620 pivoted to the frame 1 at 621, and a cam roller 622 engaging in the race of a cam 623 mounted on the cam shaft 416. The race of cam 623 has a high portion H, an intermediate portion I, and a low portion L suitably joined by sloping portions.

It will be seen from Fig. 2, that rotation of cam shaft 416 will impart timed oscillatory movement to cam 615. With the parts in the position of Fig. 2, one wrapping device is at the loading station during a dwell in the movement of turret 602, having just received a fusee and wrapper in the open position of the holding rollers. Rotation of the shaft 416 in clockwise direction brings the roller 622 of the lever 620 into the high portion of the race of cam 623, thereby lifting lever 620, connecting rod 619 and crank arm 618 and rotating cam 615 clockwise. This brings roller 613 of the wrapping unit at the loading station to the low portions 617 and permits spring 614 to close the holding rollers snugly against the fusee and wrapper sheet as platform 409 is withdrawn. During intermittent counterclockwise rotation of the turret 602 from the loading station to a spinning station at the bottom just 90° from the loading station, and then to a discharge station at the right just 180° from the loading station the holding rollers maintain their snug hold on the fusee and wrapper. The driven rollers rotate the fusee and wrap the sheet around it during the time the wrapping unit moves from the loading station to the spinning station in a manner later described in detail. Just as the unit reaches the discharge station the roller 613 approaches the high portion 616. At the same time the roller 622 has passed the low portion L and reaches the intermediate portion I of the race in cam 623 and thereby lifts lever 620, connecting rod 619 and crank arm 618, thus rotating cam 615 clockwise far enough to open the wrapping device at the discharge station but not to close the one at the loading station which must remain open long enough for the fusee and wrapper to be moved into place. This time is provided by the intermediate portion I of the race in 623, and it is only when roller reaches the high portion H that the holding rollers at the loading station are permitted to close. The wrapping unit is held open from the discharge station until it reaches the loading station by the high portion 616, but this is not essential as it could close and open again, if desired. Cam 623 makes one complete revolution for each intermittent quarter turn of shaft 601 and turret 602, but this, of course, would be modified if turret 602 carried a different number of wrapping units.

The mechanism for rotating the driven rollers 607 comprises a gear 625 loosely mounted on shaft 601 which meshes with each of the gears 606. A pinion 626 mounted on a counter shaft 627 which is journaled in frame member 600 also meshes with gear 625 as shown in Fig. 4. Also fixed to countershaft 627 is a gear 628 which meshes with pinion 629 on a stud shaft 630 journaled in upright 600 and carrying a sprocket 631. The gear ratios are such that driven rollers 607 rotate the fusee and wrapper about 3½ times while the turret moves from the loading station to the spinning station, thus completing the wrapping during a 90° movement of turret as shown in the drawings.

Intermittent movement is imparted to shaft 601 and turret 602 by a Geneva mechanism which includes a countershaft 632 journaled in upright 600 (Fig. 3) on which a Geneva driver 633 is secured, a Geneva gear fixed to shaft 601, and a sprocket 635 fixed on shaft 632. Sprockets 635 is driven at constant speed by means later described and it is apparent from the drawings that for each 180° of rotation of shaft 632, the shaft 601 is given an intermittent rotation of 90°. Shaft 632 also carries sprocket 636 for a purpose later set forth.

Fusees are removed from the wrapping device at the discharge station by a transfer lever 637 which is pivoted intermediate its ends to an upright 500 by means including a pin 638. At the upper end lever 637 carries a cam roller 639 while its lower end is bifurcated to provide fingers 640 at either side of the wrapping device which are adapted to engage the ends of the fusee (Figs. 1 and 3). The roller 639 runs in the race 641 of a cam 642 mounted on a shaft 643 journaled in the frame and driven by a sprocket 644 in a manner later described. Race 641 has low and high portions which impart timed oscillatory motion to lever 637 to cause the fingers 640 to remove a fusee when the holding rollers open and then return to starting position of Fig. 1 to repeat the operation each time a different wrapping unit arrives at the discharge position.

The parts of the wrapping units including driven rollers 607 and holding rollers 610 shown in the drawings are designed to wrap a 5 minute fusee approximately centered therein with both ends extending somewhat beyond links 603 for spinning in a manner next to be described. It has been found that the 10 minute fusee can also be satisfactorily wrapped in the same mechanism with the upper end indexed in the same position as the 5 minute fusee since the paper customarily used for this purpose is sufficiently stiff that a tight wrap is obtained even though there is no roller pressure on the lower half of the fusee during wrapping. In case less stiff paper is used, the mechanism can be simply adapted to exert rolling pressure over greater length by removing the wrapping units shown and replacing them by similar units having longer rollers. The cam 615 would also be replaced by one having a shorter hub. Fig. 4 shows that adequate space is available for this purpose.

*Wrapper end spinning device*

Figure 17:
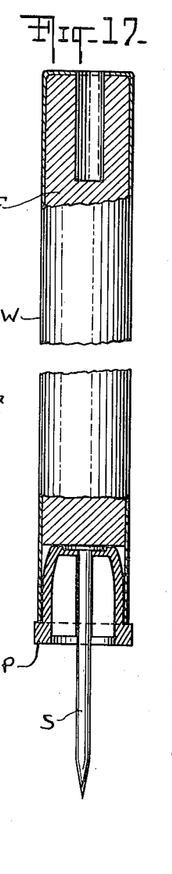
Fig. 17 is a similar view of a spike-end fusee, such as ordinarily used on railroads.

It is customary to extend the wrapper of a fusee slightly beyond the drilled end and to spin it over the periphery of the fusee end without covering the hole, as shown in Figs. 16 and 17. In the present machine, the wrapper is held in such relation to the fusee being pushed into it that the edge of the wrapper sheet extends beyond the drilled end of the fusee just the right distance to provide the proper amount for spinning over the end. For this purpose a spinning head 701 is mounted at the left of the turret 602, as seen in Fig. 4, on a shaft 702 and provided with a recess 703 which is aligned with a fusee in the turret during the dwell at the bottom position. Shaft 702 is rotatably and slidably mounted in journals 704. A pulley 705, fixed to shaft 702, is provided with a groove 706 for a V-belt 707 which also goes around a driving pulley 710 fixed to a high speed jack shaft 711 suitably journaled in the frame 1. Pulley 705 also has a groove 708 for a shift lever 709 which is pivoted at 712 to frame 1. At its upper end lever 709 is bifurcated (Fig. 1) and each arm 713 is provided with a roller 714 which rides in groove 708. At the lower end lever 709 is provided with a roller 715 which rides in the race 716 of cam 717 on cam shaft 416. The mechanism is duplicated at the right of the turret, and these parts are given the same reference numbers with a subscript a.

Spinning head 701 is shown in Fig. 4 at the innermost position it assumes during the spinning operation, having just arrived thereby reason of rotation of cam 717 clockwise as viewed from the right of Fig. 4. The fusee is rotating in the same direction due to the action of driven roller 607 while the spinning head rotates counterclockwise. As the head 701 approaches the drilled end of the fusee due to the movement of roller 715 along the sloping part of race 716 as seen in Fig. 4, it turns the free extension of the wrapper over and smoothes out any folds. The adhesive applied to the wrapper by glue roll holds the end in place after the spinning operation. Continued rotation of cam 717 brings the oppositely sloping portion (not shown) of race 716 into contact with roller 715 and returns the spinning head to its initial positions free from the fusee.

If both ends of the fusee wrapper are to be spun, spinning device 7a operates in the way described for 7 and simultaneously therewith, the only difference being that the recess 703a preferably is contoured so as to form a reverse or U-bend in the lower end of the wrapper as shown in Fig. 16. Where a plug and spike insert is to be made in the lower end of the fusee, as shown for the spike-end fusee of Fig. 17, spinner 7a is inactivated by disconnecting it from the shaft 711 and slipping shaft 702a as far to the right as necessary to clear the end of the fusees being wrapped, as may be done by loosening pulley 705a.

The drive

Electric motor 720 drives a variable speed device 721 by means of a V-belt 722 and V-belt 723 connects device 721 with a pulley 724 on jack shaft 711. The construction of the variable speed device 721 forms no part of the present invention and for this reason the details are not shown and it is to be understood that any suitable device of this type may be used. Pinion 725 on shaft 711 meshes with a gear 726 on cam shaft 416 (cf. Fig. 4) which is driven thereby in clockwise direction os viewed in Fig. 1.

The drive for the wrapper gluing and feed device 5 includes a sprocket 727 affixed to shaft 711 (cf. Fig. 4), a pair of slack take up sprockets 728 and 729 and a roller chain 730 which runs around sprockets 727 and 510.

The drive for the transfer lever 637 comprises a sprocket 731 on cam shaft 416 (cf. Fig. 4), idler sprockets 732 and 733, a slack take-up sprocket 734 and a roller chain 735 which runs around sprockets 731, 644 and 635, as shown in Fig. 1. The chain 735 travels in the direction indicated by the arrows going in turn from sprocket 731, to 734, 635, 733, 644, 732 and back to 731.

A third roller chain 736 which runs around sprocket 636 (cf. Fig. 4) transmits the motion imparted to shaft 601 by sprocket 635 and chain 735 to sprocket 631, sprocket 204 (passing around idler sprockets 737, 738 and 739 to clear other parts of the device), to sprocket 740 which is affixed to a stud shaft 741 on which pinion 742 is secured in mesh with gear 306, and to sprocket 743 on stud shaft 744 which function in a manner later described. A slack take-up sprocket 745 is provided for chain 736 which also serves to guide it clear of the other parts of the machine. Chain 736 travels in the direction of the arrows adjacent to it, going in turn from sprocket 636 around sprockets 745, 743, 740, 739, 204, 738, 737, 631 and back to 636.

A sprocket 835 on shaft 416 (cf. Fig. 4) drives a roller chain 836 which provides motive power for the plug inserting mechanism 8 now to be described.

Plug inserting mechanism

Uprights 800 are provided on frame 1 as shown in Fig. 1. Two of them at the left of the plug inserting mechanism are provided with journals for a shaft 801 (cf. Fig. 3) on which gear 802 is fixed. Gear 802 is driven through two intermediate gears 803 and 804 by a pinion 805 affixed to shaft 601 which is intermittently driven by the Geneva gear 633, 634. Sprocket 806 is affixed to shaft 801 between the two journals in uprights 800.

At the right end of the plug inserting mechanism, a shaft 807 is held at each end in a block 808 which is slidably mounted in a horizontal guide 809 in the upright 800, as seen in Fig. 1. A screw 810 passing through the block and shaft and bearing against the end of guide 809 provides adjustment of the respective journal block 808 horizontally along guides 809. Sprocket 811 is rotatably mounted on shaft 807 in the vertical plane of sprocket 806 and conveyor chain 812 runs around these two sprockets.

Fastened to the conveyor chain 812 are fusee holders 813 which are regularly spaced along the chain so that one of them is always positioned in horizontal alignment with the wrapper rolling device at its discharge station during the dwell in the movement of the turret 602 and the chain 812. This permits transfer of a wrapped fusee from the rolling device into a holder 813 by the transfer lever 637. Along the upper reach of chain 812 the fusee holders slide along supporting guides 814 and the chain is supported by bar 815 (cf. Figs. 6 and 7).

Figures 5, 11:
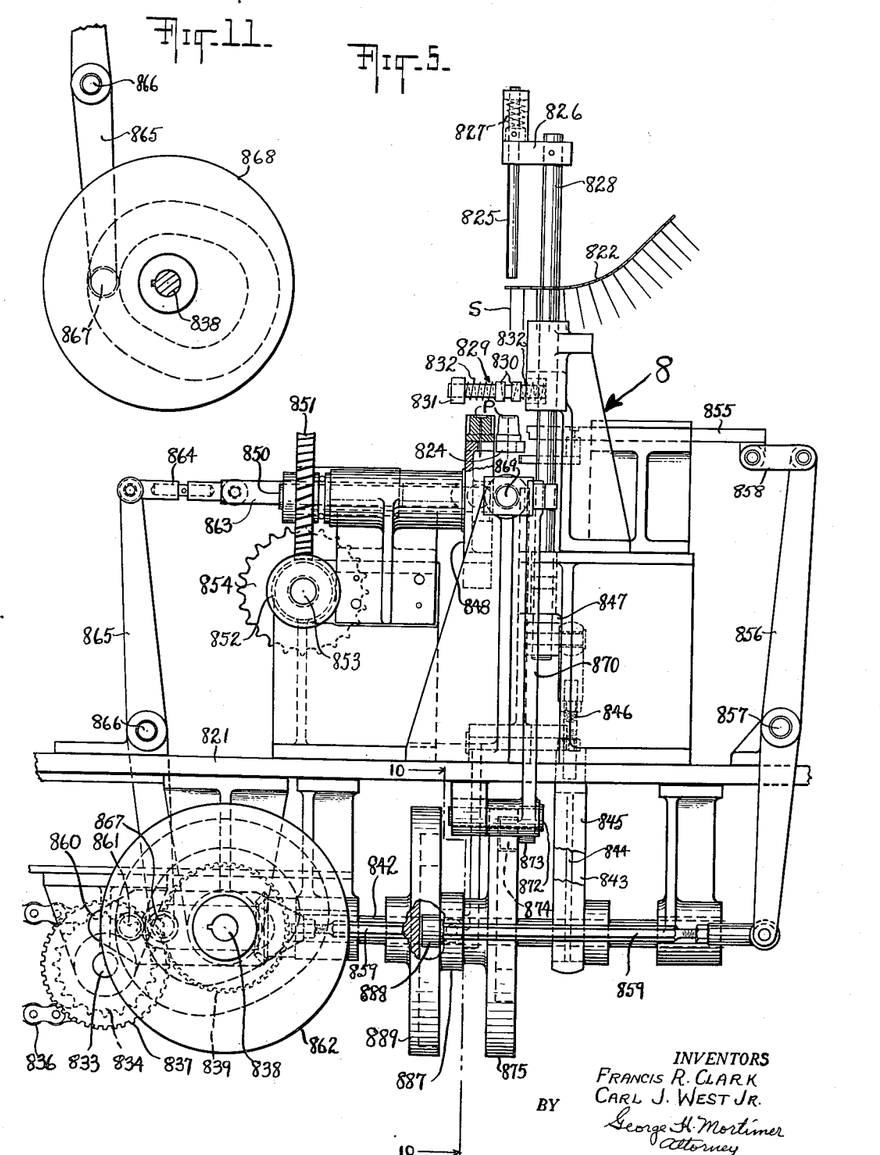
Fig. 5 is a fragmentary front elevation, with some parts in section, of a nail and plug mechanism for assembling a spike in a plug and inserting the assemblage into the cavity at the lower end of a wrapped fusee.
Fig. 11 is a section on the line 11—11 of Fig. 6.
Figure 6:
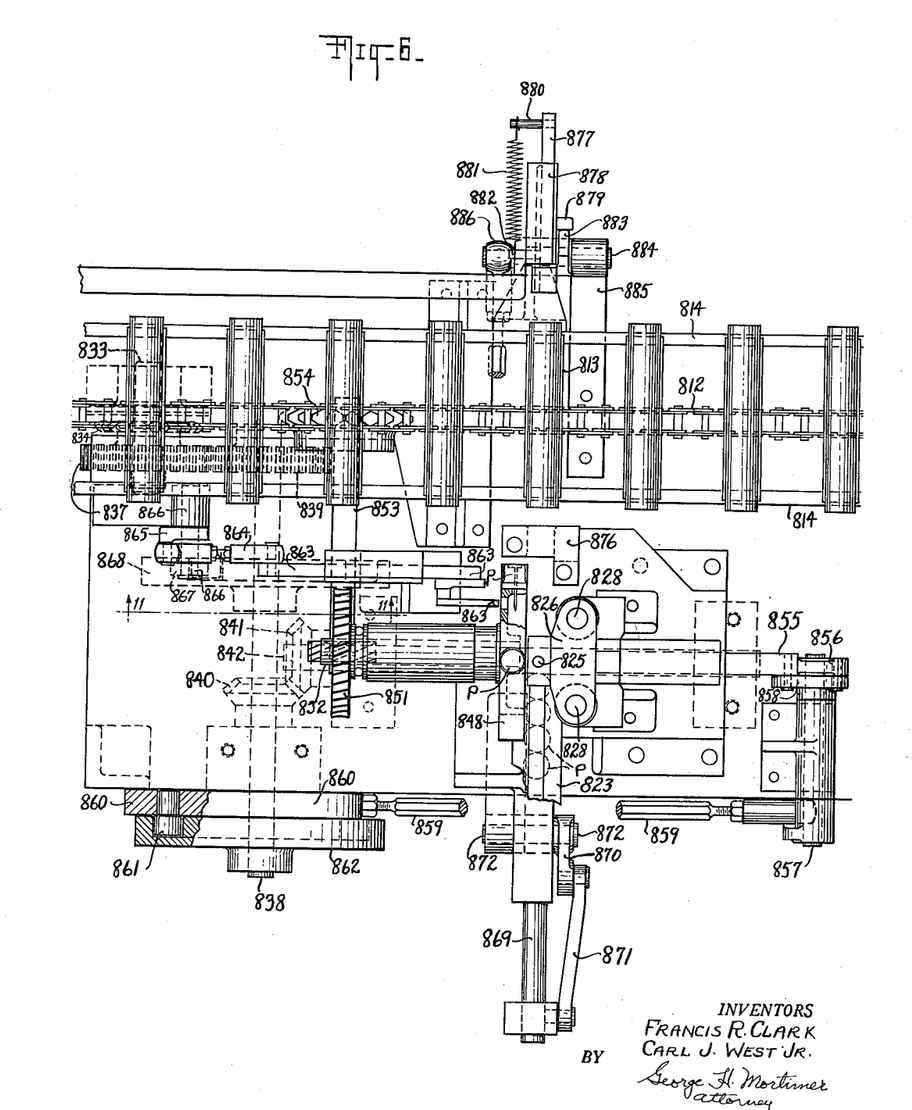
Fig. 6 is a plan view of the mechanism of Fig. 5.
Figures 7, 10:
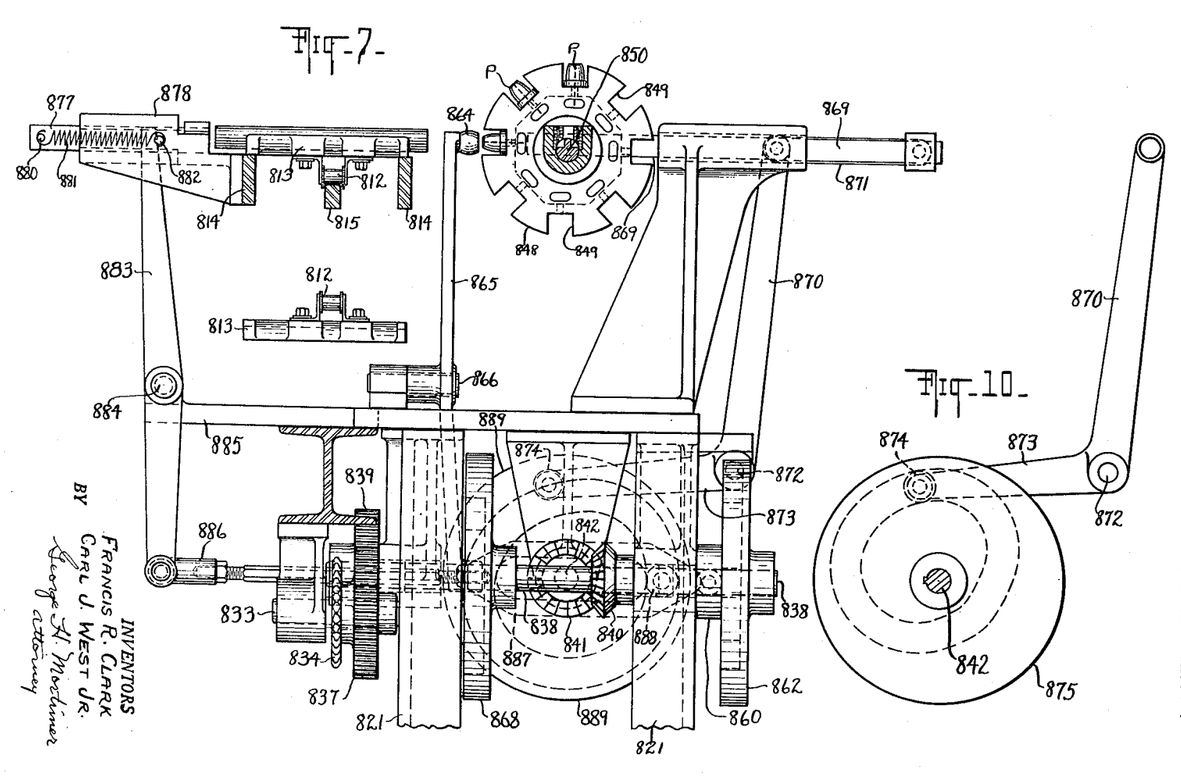
Fig. 7 is an end elevation of the mechanism of Fig. 5 looking from left toward the right.
Fig. 10 is a section on the line 10—10 of Fig. 5.

Referring now to Figs. 5, 6 and 7, the plug inserting mechanism 8, which is associated with conveyor chain 812 in the region broken away in Fig. 1, comprises a frame 821 which may be part of frame 1 but preferably is a separate frame mounted on wheels or castors (not shown) so that the whole mechanism 8 can be moved into or out of position as desired. Mechanism 8 is not used if both ends of the fusee wrapper are spun over the fusee ends by the spinning devices 7 and 7a, nor if a long handle is inserted in the lower pocket formed by the extension of the wrapper to form a torch. In the latter case particularly it is advantageous to be able to move mechanism 8 out of the way to make room for an operator who inserts these handles into the pockets by hand during a dwell in the movement of the conveyor chain.

Mounted on frame 821 is a conventional nail or spike feed chute 822 which has at its upper end a magazine (not shown) for holding a supply of the spikes S and feeding them into chute 822 one after another so that their heads support them in the chute with the sharp ends downwardly as shown in Fig. 5. At the end of the chute spring fingers support the lowest spike in position for easy removal by a hammer.

A plug feed chute 823 (Fig. 6), which is associated with a magazine of conventional type (not shown) adapted to hold a supply of the plugs P and feed them one at a time in upright position into the chute, delivers the plugs to an anvil 824 having a slot for the spike axially aligned with the lowest spike in chute 822. Also axially aligned with these parts is a reciprocating hammer 825 (Fig. 5).

The hammer 825 is mounted for limited sliding movement in a cross head 826, being normally biased downwardly by a spring 827. Cross head 826 is fixed to the upper ends of a pair of vertically reciprocating bars 828 mounted in suitable fixed guides on frame 821.

Just above the plug on anvil 824 is a spike guide 829 comprising guide blocks 830 mounted for limited horizontal movement in a guide support 831 and biased to closed position by springs 832. The abutting faces of the blocks have aligned tapered channels forming a downwardly converging guide for the sharp end of the spikes as they are removed from the end of chute 822 by the downward movement of hammer 825 to assure the proper entry of the point of the spike into the hole in the plug P on the anvil. Then as the head of the spike and the hammer enter guide blocks 830 they yield by sliding horizontally in guide support 831 against the force of the springs 832.

Stud shaft 833, which is journaled in frame 821, carries a sprocket 834 in the vertical plane of the sprocket 835 on cam shaft 416 (Fig. 4) and the chain 836 running around these two sprockets imparts the continuous rotation of shaft 416 to stud shaft 833. Also fixed to shaft 833 is a pinion 837.

A transverse cam shaft 838 is journaled in frame 821 adjacent and parallel to shaft 833 and it has a gear 839 fixed thereto in mesh with pinion 837. Intermediate its ends shaft 838 has a bevel gear 840 fixed to it which meshes with a similar bevel gear 841 fixed to the end of a longitudinal cam shaft 842. Fixed to the cam shaft 842 is an eccentric 843 having a groove 844 in its periphery. Surrounding the eccentric is the conventional strap 845 which is provided on its bearing surface with a ridge which rides in the groove 844 to hold the strap in place. A connecting rod 846 connects strap 845 with a crosshead 847 fixed to the lower ends of bars 828.

A turret wheel 848 which is provided peripherally with a plurality of pockets 849 is mounted on one end of a shaft 850 journaled in frame 821 so that a pocket positioned in the vertical plane through the axis of the shaft at the top of the wheel is adjacent to and aligned with a plug on anvil 824 (Figs. 5 and 6). A spiral gear 851 is fixed to the other end of shaft 850 and it meshes with its companion spiral gear 852 which is fixed to one end of a shaft 853 suitably journaled in frame 821 so that a sprocket 854 fixed to its other end engages conveyor chain 812 and is driven intermittently thereby. The drive mechanism for turret 848 just described is so adjusted that at each dwell of the chain 812 a pocket 849 is indexed at the top and another 90° beyond, i. e., in the vertical and horizontal planes, respectively of the axis of the turret.

A horizontally reciprocable transfer slide 855 is mounted in the frame 821 in line with a plug on anvil 824. At the end adjacent to the anvil, slide 855 is bifurcated, one arm passing above the anvil to contact the plug and the other passing under it simultaneously to contact the end of the spike when the slide moves to the left, as seen in Fig. 5. A rock lever 856, pivoted to frame 821 intermediate its ends by pin 857, is connected by link 858 at its upper end to slide 855 and by connecting rod 859 at its lower end to a fork 860 slidably mounted on shaft 838 and having a roller 861 rotatably secured thereto which rides in the race of a cam 862 on cam shaft 838. The shape of the race is shown in dotted lines in Fig. 5.

A second horizontally reciprocable transfer slide 863 is mounted in the frame 821 in line with a plug in a pocket 849 which is indexed in the aforementioned horizontal plane. The end of slide 863 adjacent to the turret 848 is bifurcated (Fig. 6) and functions as described for slide 855 to transfer the plug and nail from the turret and align it with a plug insert slide later described. A link 864 connects slide 863 with the upper end of a rock lever 865 which is pivoted by pin 866 to frame 821 intermediate its ends. At its lower end lever 865 carries a roller 867 which rides in the race of a cam 868 fixed to cam shaft 838 (Figs. 6 and 7). The shape of the race is shown in dotted lines in Fig. 11.

A plug insert slide 869 is slidably mounted for horizontal movement in frame 821 with its axis in the horizontal plane of the shaft 850 and the vertical plane of hammer 825. A link 871 connects slide 869 to the upper end of a bell crank lever 870 which is pivoted to frame 821 by a pin 872. The arm 873 of bell crank 870 extends more or less horizontally somewhat beyond the vertical plane of longitudinal cam shaft 842 at which point a roller 874 is pivoted to it. Roller 874 rides in the race of a cam 875 on cam shaft 842. The shape of the race is shown in dotted lines in Fig. 10.

Axially aligned with slide 869 is a funnel guide 876. The passage in this guide is flared outwardly slightly on the conveyor side, as shown in dotted lines in Fig. 6, so that the end of a wrapped fusee having the pocket for receiving the plug can be guided into the passage in which it snugly fits. The guide 876 may be of fixed bore but preferably it is split on a vertical plane and the two halves are mounted for slight horizontal movement against the force of springs tending to hold them together in a manner similar to guide 829. The transfer slide 863 deposits the plugs from the turret 848 in axial alignment with slide 869 and funnel guide 876 so that movement of slide 869, which is drilled to receive the spike, pushes the plug through guide 876.

Also axially aligned with slide 869 and funnel guide 876 on the other side of conveyor 812 is a fusee locater slide 877 mounted for horizontal reciprocation in a guide 878 on supporting guide 814 (Fig. 7). Guide 878 is open along one side to permit passage of a pin 879 which is fixed to the slide 877 intermediate its ends. At the end remote from the conveyor, slide 877 carries a pin 880 to which a spring 881 is attached at one end. Its other end is attached to a pin 882 on the guide 878 so that slide 877 is spring biased toward the conveyor. A rock lever 883 is pivoted intermediate its ends by pin 884 to a frame piece 885 on frame 821 with its upper end adjacent to the open side of guide 878 and in the path of pin 879 (Fig. 6). The lower end of rock lever 883 is pivoted to a connecting rod 886 which has a fork 887 at its other end mounted on cam shaft 842 (Fig. 5). Fork 887 has a roller 888 pivoted to it which runs in a race in cam 889 fixed to shaft 842. The shape of the race is shown in dotted lines in Fig. 7.

The plug inserting mechanism 8 operates as follows: A plug P is fed down chute 823 and comes to rest on anvil 824 with the axial spike hole therein aligned with the first spike S in chute 822. Rotation of cam shaft 842 rotates the eccentric 843 thereby bringing hammer 825 down upon the head of spike S and removing it from chute 822. Continued movement of hammer 825 forces the spike through guide 829 into the plug until the head seats against the plug, guide blocks 830 opening to permit the head and hammer to pass. The hammer is then returned to its uppermost position shown in Fig. 5. As the hammer begins to rise, roller 861 is moved to the right by cam 862 and this motion is transmitted by fork 860, connecting rod 859, rock lever 856 and link 858 to slide 855 which moves to the left and transfers the plug and spike on anvil 824 into a pocket 849 in turret 848 which has been indexed to receive it. Continued rotation of cam 862 causes slide 855 to return to the position shown in Fig. 5. The foregoing operations are performed each time cam shafts 838 and 842 make a complete revolution. Wheel 843 has been illustrated with 8 pockets, but it will be understood that any desired number can be used in the manner described by properly coordinating the angle of rotation of the wheel with the movement of the other parts. In any case a pocket is filled each time it dwells at the top position and at a later dwell it is aligned with slide 863 which moves simultaneously with slide 855 to transfer the plug and spike from the pocket 849 to the frame piece upon which funnel guide 876 is mounted and in alignment with said guide with the spike pointed toward slide 869. At the same time cam 889 shifts connecting rod 886 to the left seen in Fig. 7 to move lever 883 toward the conveyor and permit spring 881 to pull slide 877 in the same direction. As this motion takes place the conveyor chain 812 is stationary with a fusee in one of the holders 813 indexed in alignment with slides 869 and 877. Slide 877 pushes the fusee along the holder 813 until the end is snugly held in guide 876 whereupon cam 875 rotates bell crank 878 to force slide 869 toward the fusee. The end of slide 869 which contacts the plug is recessed to receive the spike so that the slide engages the plug and drives it into the pocket or recess in the end of the fusee formed by the extension of the wrapper sheet. Since the sheet was glued prior to being wrapped about the fusee, the plug will be adhesively held to the wrapped fusee. If desired, additional adhesive may be sprayed into the recess by mounting an ordinary spray gun on the frame adjacent to the conveyor and causing it to operate each time the conveyor dwells by any automatic device, e. g., a trigger on the gun in the path of the holders 813 to operate an air valve in the air line to the gun. It will be observed that the fusee is not positively compressed between slides 869 and 877 since 877 is only spring biased toward 869. This provides automatic adjustment for fusees of different lengths. The force of the spring 881 is sufficient to assure proper positioning of the plug in the recess of the wrapped fusee. As soon as the plug is forced completely into the recess, as shown in Fig. 17, slide 869 pushes the assembled fusee and plug, together with the slide 877, against the force of the spring 881 until the fusee occupies its original position in the holder 813. Then cams 875 and 889 return the slides 869 and 877 to their position shown in Figs. 6 and 7. As soon as the slides are clear of the fusee, the chain 812 moves one step to index the next fusee to receive its plug, and it is this motion which causes turret 843 to move one step also through the interposition of sprocket 854, shaft 853, spiral gears 852 and 851, and shaft 850.

*Disc applicator*

Fusees without spikes customarily have a plug or disc D of pressboard, paper, fiber, plastic or the like at the bottom end around which the wrapper is spun, as shown in Fig. 16. The mechanism for applying such plugs or discs to the end of the fusee is shown in Figs. 12, 13 and 14.

Figure 12:
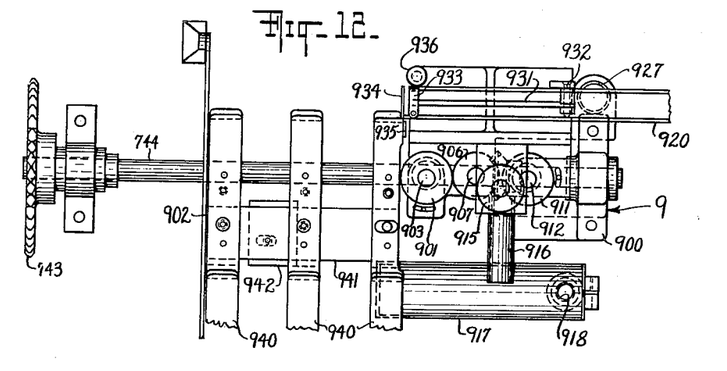
Fig. 12 is a fragmentary plan view of a disc applicator mechanism.

The parts of the disc applicator 9 are mounted on a frame 900 which is slidably mounted on frame 1 so as to be movable toward and away from pusher 402, being shown in Fig. 12 in its operative position adjacent to the pusher. A glue applicator roll 901 is rotatably mounted in frame 900 so as to be adjacent to the bottom step of pusher 402 somewhat in advance of the rearmost position of the front of the next step, which is the position the pusher occupies in Figs. 1, 12 and 13. This permits a fusee to drop from the next higher step without interference. At the other side of pusher 402, a guide 902 is affixed to frame 1 against which guide the ends of the fusees remote from the glue applicator roll 901 bear as they pass the gluing point.

Roll 901 is mounted on the end of a vertical shaft 903 suitably journaled in frame 900. Above the journal box a collar 904 is fixed to shaft 903 and forms a thrust bearing to keep the shaft in proper position. At the lower end of shaft 903 is fixed a gear 905.

Adjacent to roll 901 is a glue transfer roll 906 on a vertical shaft 907 which also carries a pinion 908 in mesh with gear 905 and a bevel gear 909 in mesh with a bevel gear 910 on shaft 744. Shaft 744 is driven by chain 736 and sprocket 743 as already set forth.

Adjacent to roll 906 is a glue feed roll 911 on a vertical shaft 912 on which is fixed a collar 913 above the journal box and a gear 914 below it which meshes with pinion 908.

Above rolls 906 and 911 a glue funnel 915 is secured to frame 1 which is adapted to feed a stream of glue into the bight formed by these two rolls and thereby form a film of glue on the transfer roll 906 which is then transferred to roll 901. Below the bight of rolls 906 and 911 a glue tube 916 is secured to the journal box which leads excess glue to a glue channel 917 which is provided with a down spout 918. The glue from the down spout may be returned by a pump to the supply, or a container may be provided to catch it and the operator may return it to the supply by hand.

A disc magazine 920 in the form of a semicircular channel is mounted on frame 900 to the right of the glue applicator as seen in Figs. 1 and 13. It preferably includes a horizontal portion adjacent to the pusher 402 and an upwardly sloping portion throughout the greater portion of its length as seen in Fig. 14. A follower 921 is provided on channel 920 which comprises rollers 922 and a follower plate 923 mounted between side walls. A cord 924 is fastened at one end to follower 921 and it runs around pulley 925 which is mounted on frame 900 and pulley 926 which is mounted at the top end of a weight tube 927 in which a weight 928 slides, the other end of cord 924 being fastened thereto. This provides the necessary force on follower plate 923 to assure feed of the discs down the magazine channel 920 so that the lowermost disc in the magazine always rests against stops 934 at the lower end thereof.

Above the lower end of the magazine is a lever 931 which is pivotally mounted at its upper end to the magazine 920 by a pin 932 and its lower end lies under a bar 933 which limits its upward movement. Lever 931 rests upon the upper edges of discs in the magazine and assists in feeding them upright against thin stop plates 934 which are secured to the end of the magazine. These plates 934 have somewhat arcuately shaped opposed edges (Fig. 13) which are spaced far enough apart to permit an ejector 935 to pass between them and push the lowermost disc out of the magazine. The ejector 935 is a small plate secured to the side of pusher 402 at the end of the lowermost step 403. As the pusher moves to the right, as viewed in Figs. 1 and 13, with a fusee resting on platform 409 after the application of glue to the end thereof adjacent to magazine 920, the end just clears the stop plates 934 and when it is aligned with the lowermost disc therein ejector 935 engages and moves it synchronously with the fusee. A roller 936 engages the disc as it emerges from the stop plates 934 and presses it against the glued end of the fusee where it is adhesively held while the fusee moves into the wrapping device.

If the fusees are to be finished with spiked plugs, it is only necessary to omit filling the disc magazine and shut off the glue to funnel 915. Since fusees of different lengths, e. g., both 5 and 10 minute fusees, are finished with discs, the disc applicator 9 is slidably mounted on frame 1 for movement to the right and left as viewed in Fig. 12 so that it can be properly adjusted and locked in place to cooperate with the particular fusee length being finished. For longer fusees the extending end must be supported on the pusher. This may be easily accomplished by securing a removable stepped bar to the right side of pusher 402, as viewed in Fig. 1. While any suitable structure of pusher 402 may be used, that shown in the drawings is simple and satisfactory. As seen in Fig. 12, the stepped portion comprises a plurality of strips 940 running longitudinally of the machine which are secured to cross pieces 941 adjacent to the forward end and the rear end, respectively. These cross pieces are supported by brackets 942 which are mounted on a table 943. Secured to the corners of table 943 on the underside thereof are guides 944 which are slidably mounted on bars 401, as already described. Each strip 940 may be made by securing shorter pieces together in overlapping relation (Fig. 13) to constitute the steps of the pusher. An extra strip of similar construction is readily secured by brackets or the like to the cross pieces 941 and brackets 942 when long fusees are being finished and by making it like the one closest to the disc applicator, the latter can be made to function for either long or short fusees, as desired.

Operation

For finishing fusees of the type illustrated in Fig. 16, the disc applicator is adjusted to the proper position, such as shown in Fig. 12, and the magazine 920 is loaded with discs standing on edge with the follower 921 urging them downwardly. Glue is supplied to trough 508 and to funnel 915. The hopper 213 is charged with a plurality of the fusee rods and the magazine 501 with a stack of corresponding wrapper sheets. Spinning head 701a and associated parts are adjusted to proper active position. Motor 720 is then started to drive all the moving parts in the manner already described.

A fusee will then be finished as follows: Conveyor 212 transports the fusee rod to chute 216 which guides it to a pocket 303 in the turret 302 of the drilling mechanism 3. While held therein by bell crank 304, the hole in the far end of the fusee is drilled during clockwise rotation of the turret, as viewed in Fig. 1. When the fusee reaches the guide 408 it is released and dropped onto the pusher 402. In passing down the stepped pusher to the platform 409 the near end of the fusee is coated with glue and a disc is applied thereto by mechanism 9 in the manner described. Platform 409 and pusher 402 then travel simultaneously to the right into the lower end of the adhesive coated side of a wrapper sheet which has been withdrawn from the magazine 501, coated with glue and fed in timed relation between guides 513 and 514 into the path of the fusee on the platform. Continued movement of the platform and pusher carries the fusee and wrapper adjacent to the wrapping unit at the loading station when the leading edge of platform 409 reaches the limit of its travel close to projection 604a at which time pusher 402 transfers the fusee and wrapper into the unit between projections 604a which temporarily hold them as the pusher and platform withdraw and the holding rollers close. The turret 602 then makes a 90° counterclockwise revolution, bringing the unit and fusee to the spinning station during which the driven rollers 607 rotate the fusee and wrap the cover around it. At the moment of dwell of the turret 602, heads 701 and 701a move inwardly folding the extending ends of the wrapper over the drilled end and disc respectively, as shown in Fig. 16, whereupon they both withdraw. The next 90° revolution of turret 602 brings the finished fusee to the discharge station where lever 637 transfers it to the chain conveyor 812 or, if desired, directly into a packing case by removing the supporting bar B which normally supports a fusee during transfer from the turret 602 to the chain 812.

For finishing fusees of the type shown in Fig. 17, the disc applicator is inactivated, either as described above or by moving it out of the way, wrappers of proper size are placed in magazine 501, spinner 701a is inactivated and moved out of the way, the plug applicator 8 is connected for operation and the nail and plug magazines thereof are loaded. The various parts operate as described for the other type of fusees except that the near end is not coated with glue, no disc is applied and the extension of the wrapper at this end is not spun during the dwell at the spinning station. The fusee arrives, therefore, in a holder 813 with the recess or pocket in the near end open to receive a plug and nail in the manner described during the dwell of the chain 812 at the plug inserting station.

Although the invention has been described and illustrated in conjunction with the best known embodiment of the principles of the invention, many changes in details of construction and arrangement of parts or elements of the combination may be made without departing from the spirit of the invention or the scope thereof as defined in the appended claims.

Having thus described the invention, what is claimed is:

1. A wrapping device for cylindrical objects comprising a turret; a plurality of rolling devices mounted on said turret, each rolling device comprising a driven roller and a plurality of holding rollers, said holding rollers being mounted for relative movement to open and closed positions; means for imparting intermittent rotary motion to said turret to index each rolling device for a dwell successively at a loading station and a discharge station; means for moving said holding rollers of each rolling device to open position to receive a cylindrical object and wrapper at the loading station; means for depositing a cylindrical object and an end of a wrapper in each rolling device during a dwell at the loading station; means for moving said holding rollers of each rolling device during the dwell at the loading station to closed position; means to drive said driven roller and thereby wind said wrapper around said cylindrical object as the turret moves from the loading station toward said discharge station;

and means for moving said holding rollers to open position at said discharge station.

2. A wrapping device as set forth in claim 1 in which said turret has a spinning station between said loading and discharge stations, the rolling of said wrapper being completed by the time the object reaches the spinning station, and means for spinning an end of said wrapper over the edge of an end of said object at the spinning station.

3. A wrapping device for cylindrical objects comprising a frame, a shaft journaled in said frame, a turret secured to said shaft for rotation therewith, means for intermittently rotating said shaft a partial revolution, a driven roller journaled to said turret and having a gear, a pinion loosely mounted on said shaft, said pinion meshing with said gear, and means for driving said pinion independently of the rotation of said shaft.

4. A device as set forth in claim 3 which comprises a pair of holding rollers journaled in links pivoted to said turret, resilient means biasing said holding rollers to closed position, a cam loosely mounted on said shaft, an arm on one of said links engaging said cam, and means for moving said cam independently of the rotation of said shaft for opening said holding rollers against the force of said resilient means.

5. A device for wrapping cylinders comprising a turret, a plurality of wrapper rolling devices mounted on said turret, means for intermittently rotating said turret to index each of said wrapper rolling devices for a dwell successively at a loading station and a discharge station, each wrapper rolling device comprising a driven roller adapted to rotate a cylinder and wind a wrapper around it and a plurality of holding rollers movable to open position to receive a cylinder and an end of a wrapper and to wrapping position to hold the cylinder and wrapper against said driven roller during the winding of the wrapper around the cylinder, cam means for moving said holding rollers of each rolling device to open position during a dwell for discharge and loading at said stations, and means for moving said holding rollers of each rolling device to wrapping position during a dwell at said loading station.

6. A device for wrapping a sheet of paper around successive cylinders comprising a wrapper rolling device comprising two driven rollers and two movable holding rollers, means for moving said holding rollers to open position to receive a cylinder and sheet of paper and then to closed position, means for driving said driven rollers when said holding rollers are in closed position to wrap said sheet of paper around the cylinder, means for feeding successive sheets of paper downwardly with the lower end adjacent to said wrapper rolling device, a guide for said sheets comprising narrow means for engaging the side of the sheet away from said wrapper rolling device, means for applying adhesive to said side of the sheet except in bands engaged by said narrow means, and mechanism for feeding successive cylinders horizontally into the lower end of the adhesive coated sheet and then into said wrapper rolling device.

7. A device for wrapping cylinders comprising a plurality of rotatable parallel rollers journaled in bearings which are relatively movable whereby said rollers are adapted in wrapping position to engage and rotate a cylinder and in open position to receive and discharge cylinders, means for moving said rollers to open and to wrapping position, means for introducing a cylinder and wrapper into said rollers when in open position with the wrapper extending beyond the end of the cylinder, means to rotate at least one of said rollers in wrapping position to wrap the wrapper about said cylinder, a shaft mounted for axial and rotative movement in axial alignment with a wrapped cylinder in said rollers, a spinning head mounted on the end of said shaft adjacent to said cylinder, means for rotating said shaft and spinning head, means for moving said spinning head into contact with the extended portion of said wrapper for folding the same over and against the end of said cylinder.

8. A machine for wrapping fusee rods having a hole in one end which comprises a wrapper rolling device, means for feeding a succession of adhesive coated wrappers adjacent to said wrapper rolling device with the coated side away therefrom, said wrappers being of sufficient length to extend beyond both ends of a rod, means for feeding a rod into the adhesive coated side of said wrapper adjacent to one end thereof and on into said wrapper rolling device, the end of said rod having the hole being spaced from an edge of said wrapper a distance approximately equal to the radial distance from the edge of the hole to the periphery of the rod, means for driving the wrapper rolling device to wind the wrapper around the rod, and means for spinning the end of the wrapper extending beyond the end of the rod having the hole over and against the said end whereby the end is covered but the hole is left open.

9. A machine for wrapping cylindrical objects comprising means for applying adhesive over substantially all of one side of a succession of wrappers, means for feeding said coated wrappers downwardly with the lower end free, a wrapper rolling device adjacent to said free lower end on the uncoated side of said wrapper, a horizontally reciprocating platform adjacent to said free lower end on the coated side of said wrapper, means for feeding a succession of said cylindrical objects one at a time onto said platform and from said platform into the wrapper and into the rolling device as the platform moves in that direction, and means for driving said rolling device to wind the wrapper around the object.

10. A machine for wrapping cylinders comprising a turret, means for rotating the turret intermittently to index wrapper rolling devices thereon successively at loading, spinning and discharging stations, each wrapper rolling device comprising a plurality of rollers, one of said rollers being bodily movable away from the others to open position to receive and discharge cylinders and toward the others to wrapping position, a cam mounted adjacent to said turret for controlling the opening and closing movements of said bodily movable roller, means for moving said cam independently of said turret, one of said rollers having a gear connected thereto, a pinion gear mounted adjacent to said turret meshing with said roller gear, and means for rotating said pinion gear independently of said turret.

11. A machine as set forth in claim 10 having means for feeding a cylinder horizontally into a wrapper rolling device at the loading station, means for removing the cylinder horizontally from the wrapper rolling device at the discharge station, and means aligned with the cylinder at the spinning station for spinning an extended end of the wrapper over and against the end of the cylinder.

12. A machine as set forth in claim 10 including means for feeding an adhesive coated wrapping sheet downwardly adjacent to said loading station with a free lower end adapted to be carried into the wrapping device by the cylinder.

13. A machine for preparing fusees comprising a framework; a turret mounted for rotation in said framework; a plurality of wrapper rolling devices mounted on said turret; means for rotating said turret intermittently to locate each wrapper rolling device successively at a loading station, a spinning station and a discharge station; a magazine mounted on said framework adapted to hold a supply of wrappers somewhat longer than the fusee cylinders to be wrapped and wide enough to go around it a plurality of times; means mounted on said framework for removing successive wrappers from said magazine and feeding them to a position adjacent to said loading station; means for applying adhesive to the surface of wrappers remote from said turret; means mounted on said framework for feeding a fusee cylinder into the adhesive coated side of a wrapper in said position adjacent to one edge and between the ends of the wrapper and on into a wrapper rolling device positioned at said loading station; means for driving said wrapper rolling device to wrap said wrapper around said fusee cylinder a plurality of times as it moves from the loading to the spinning station; and means mounted on said framework at said spinning station for spinning an end of said wrapper over the edge of an end of said fusee cylinder at said spinning station.

FRANCIS R. CLARK.
CARL J. WEST, Jr.

References Cited in the file of this patent
UNITED STATES PATENTS

| Number | Name | Date |
| --- | --- | --- |
| 998,830 | Batdorf | July 25, 1911 |
| 1,008,237 | Bretherton | Nov. 7, 1911 |
| 1,108,027 | Thorschmidt | Aug. 18, 1914 |
| 1,163,709 | Thorschmidt | Dec. 14, 1915 |
| 1,255,836 | Thompson | Feb. 15, 1918 |
| 1,522,153 | Stillwell | Jan. 6, 1925 |
| 1,666,581 | Rainaud | Apr. 17, 1928 |
| 1,913,259 | Bashford | June 6, 1933 |
| 1,936,494 | Bashford | Nov. 21, 1933 |
| 2,037,631 | Hulten | Apr. 14, 1936 |
| 2,092,066 | Haupt | Sept. 7, 1937 |
| 2,160,179 | Spatta | May 30, 1939 |
| 2,277,128 | Miller | Mar. 24, 1942 |
| 2,337,528 | Stuckert et al. | Dec. 21, 1943 |
| 2,349,638 | Schreiber | May 23, 1944 |
| 2,371,580 | Goodwin | Mar. 13, 1945 |
| 2,371,874 | Chapman et al. | Mar. 20, 1945 |
| 2,397,190 | Malhiot | Mar. 26, 1946 |